US009793541B2

United States Patent
Upreti

(10) Patent No.: US 9,793,541 B2
(45) Date of Patent: Oct. 17, 2017

(54) COMPOSITE SILICON OR COMPOSITE TIN PARTICLES

(71) Applicant: Shailesh Upreti, Ithaca, NY (US)

(72) Inventor: Shailesh Upreti, Ithaca, NY (US)

( * ) Notice: Subject to any disclaimer, the term of this patent is extended or adjusted under 35 U.S.C. 154(b) by 0 days.

(21) Appl. No.: 15/271,807

(22) Filed: Sep. 21, 2016

(65) Prior Publication Data

US 2017/0012285 A1 Jan. 12, 2017

Related U.S. Application Data

(63) Continuation of application No. 15/149,112, filed on May 7, 2016, now Pat. No. 9,470,201, which is a continuation of application No. 13/815,258, filed on Feb. 14, 2013, now Pat. No. 9,337,478.

(60) Provisional application No. 61/598,681, filed on Feb. 14, 2012.

(51) Int. Cl.

| | |
|---|---|
| *H01M 4/36* | (2006.01) |
| *H01M 4/134* | (2010.01) |
| *H01M 4/1395* | (2010.01) |
| *H01M 4/38* | (2006.01) |
| *H01M 4/04* | (2006.01) |
| *F02P 3/05* | (2006.01) |
| *F02P 3/055* | (2006.01) |
| *F02P 11/02* | (2006.01) |
| *C01B 33/021* | (2006.01) |
| *H01M 4/48* | (2010.01) |

(52) U.S. Cl.
CPC .......... *H01M 4/366* (2013.01); *C01B 33/021* (2013.01); *F02P 3/053* (2013.01); *F02P 3/0554* (2013.01); *F02P 11/02* (2013.01); *H01M 4/0447* (2013.01); *H01M 4/134* (2013.01); *H01M 4/1395* (2013.01); *H01M 4/364* (2013.01); *H01M 4/386* (2013.01); *H01M 4/387* (2013.01); *H01M 4/48* (2013.01); *Y02E 60/122* (2013.01)

(58) Field of Classification Search
None
See application file for complete search history.

(56) References Cited

U.S. PATENT DOCUMENTS

2004/0214085 A1* 10/2004 Sheem .................. H01M 4/134
429/218.1

* cited by examiner

*Primary Examiner* — Wyatt McConnell
(74) *Attorney, Agent, or Firm* — Feldman Law Group, P.C.; Steven M. Crosby

(57) ABSTRACT

The specification relates to a composite particle for storing lithium. The composite particle is used in an electrochemical cell. The composite particle includes a metal oxide on the surface of the composite particle, a major dimension that is approximately less than or equal to 40 microns and a formula of MM'Z, wherein M is from the group of Si and Sn, M' is from a group of Mn, Mg, Al, Mo, Bronze, Be, Ti, Cu, Ce, Li, Fe, Ni, Zn, Co, Zr, K, and Na, and Z is from the group of O, Cl, P, C, S, H, and F.

8 Claims, 6 Drawing Sheets

Focused ion beam (FIB) intersected images of a spherical composite particle revealing a 3D open structure.

Figure 10a  Figure 10b
 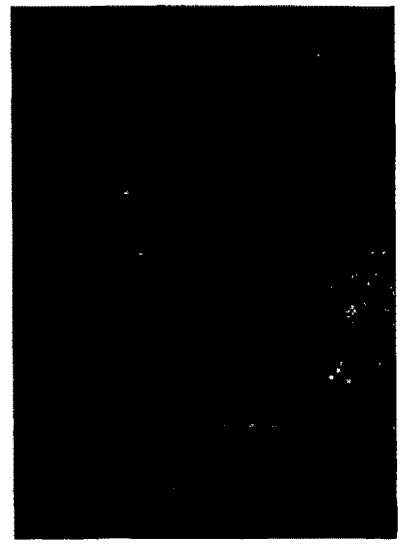
←── 338 nm ──→     ←── 338 nm ──→
Electron energy loss spectroscopy (EELS) showing nano dimensional surface texture seen around composite particles
Figure 11
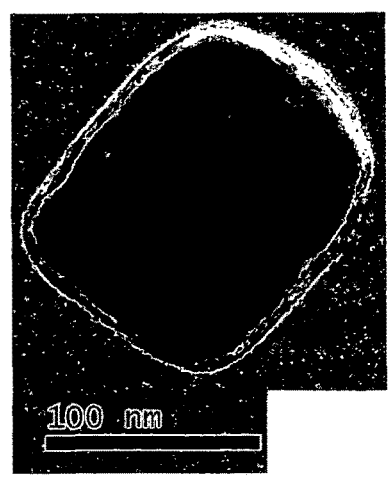
Transmission electron microscopy (TEM) image showing texture around composite particle.

COMPOSITE SILICON OR COMPOSITE TIN PARTICLES

CROSS-REFERENCE TO RELATED APPLICATIONS

This application is a continuation of pending U.S. patent application Ser. No. 15/149,112, filed May 7, 2016, which is a continuation of U.S. patent application Ser. No. 13/815, 258, filed Feb. 14, 2013, now U.S. Pat. No. 9,337,478, issued on May 10, 2016, which claims priority to U.S. Provisional Patent No. 61/598,681 filed Feb. 14, 2012, all hereby incorporated by reference.

BACKGROUND

The disclosed technology relates generally to composite silicon or composite tin particles used to store lithium such as in a rechargeable lithium battery. Traditionally, batteries used graphite or other carbon based composites as anode material. Graphitic carbon has historically performed well due to its low voltage vs. lithium, high conductivity, decent cycle life and wide availability. However, for the performance of lithium ion batteries to be further improved, it is essential to realize an economic material capable of storing greater amounts of lithium and provide a higher energy density and specific capacity than graphite. More recently batteries have started using Sn and Si based anodes by mixing these with different metals or alloys with carbon to make composites.

There are several classes of Si and Sn materials. For example, one class of Si material is formed using an etching method to produce porous silicon. This etching method using hard acids such as HF/HNO3 to make pores in pure silicon crystals. Other etching methods etch pure silicon to make porous three-dimensional silicon particles used in High-Performance Lithium Secondary Batteries. Again these etching methods use an HF acid.

Another class of Si can be nano-crystallites. These nano-crystallites may be formed by ultra-fast cooling a melt of an aluminum alloy and then performing two etching steps. The first is to etch the aluminum away from the silicon and then, second, etch voids into clusters of the nano-crystallites. Another class of silicon based anode materials is formed by creating a metal matrix or metal compound coating around the silicon materials. This class of Si may be used as a negative active material for rechargeable lithium battery.

SUMMARY

This specification describes technologies relating to composite silicon or composite tin particles for use in an electrochemical cell and a method for making the same. The composite silicon or composite tin particles of the disclosed technology form a composition that has (i) a textured protection surface for easy SEI (solid electrolyte interface) formation, (ii) atomic solubility to improve the intrinsic conductivity of the particles so that a battery formed from these particles is useful for high rate application and (iii) a selectively textured surface for electrolyte reactivity.

The composite silicon or composite tin particles of the disclosed technology also has a high surface area, with micron size primary particles size being composed of a core composition encased within another composition providing for stable cycling of the cell also enhancing the formation of the SEI layer and stabilizing the SEI layer during cycling.

The structure of the composite silicon or composite tin particles possess columns arranged in an array such that the columns are joined crystallographically and extend into space thereby providing for a separation between crystallite extensions which in use accommodate for volume expansion.

The composite silicon or composite tin particles can have (1) at least 10 m2/g of surface area due to an open structure, (2) a total surface area of greater than 20 m2/g, (3) greater than 50% of the composite silicon or composite tin particles having dendrites wherein each finger has a length greater than at least 10 times the diameter, and (4) greater than 30% of the fingers being, oriented in the same crystallographic plane. The composite silicon or composite tin particles can also be 90 wt % silicon or tin, 7 wt % aluminum and 3 wt % oxide.

The composite silicon or composite tin particles can be formed from, for example an Al—Si, alloy powder by applying light acids in a pH controlled environment. The light acids removes the matrix material and acid treatment is terminated upon the formation of the composite and in such a manner as to minimize pore formation and facilitate column morphology within the primary particle.

The silicon or tin composite can further include a binder inserted into the separation between the crystallite extensions of the composite silicon or composite tin particles. The composite silicon or composite tin particles can also be heated at an elevated temperature under different gas atmospheres to increase electrochemical performance of the composite silicon or composite tin particles. The composite silicon or composite tin particles may also be mixed with a carbon material. The carbon material is sp2 carbon or conductive carbon or graphitic carbon like carbon black or nano carbon or graphene or graphite or acetylene black.

In another implementation, an electrochemical rechargeable cell can comprise an anode made from a composite silicon or composite tin, a binder and a solvent.

BRIEF DESCRIPTION OF THE DRAWINGS

FIGS. 10a-b provides images of a nano dimensional surface texture seen around composite particles; and FIG. 11 provide an image showing a texture around a composite particle.

DETAILED DESCRIPTION

Figure 1:
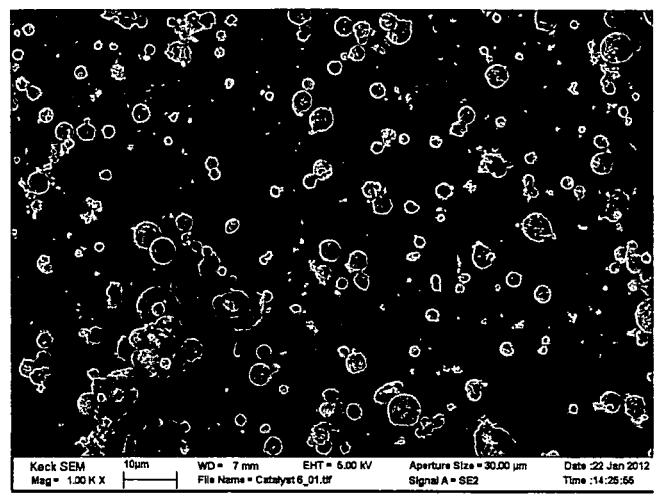
FIG. 1 is a SEM 1 k×view of an embodiment of the present invention.
Figure 2:
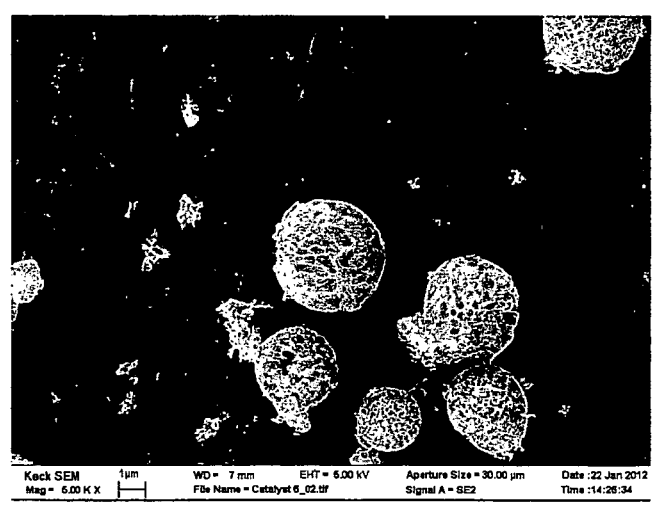
FIG. 2 is a SEM 5 k×view of an embodiment of the present invention.
Figure 3:
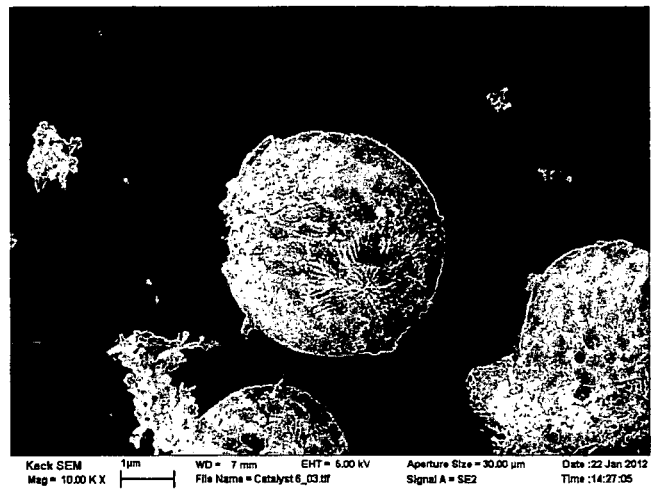
FIG. 3 is a SEM 10 k×view of an embodiment of the present invention.
Figure 4:
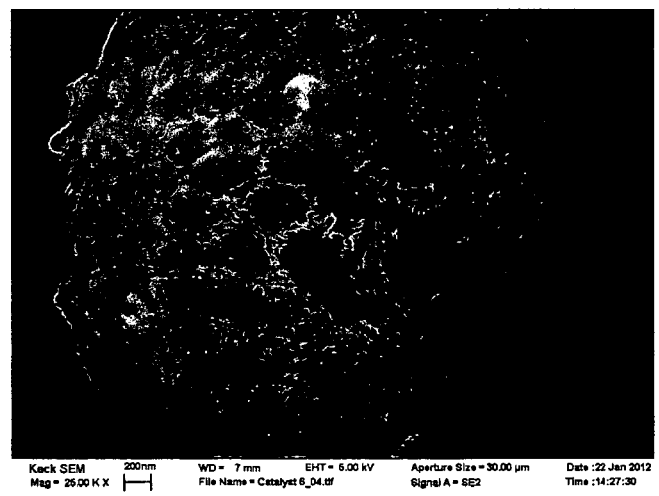
FIG. 4 is a SEM 25 k×view of an embodiment of the present invention.
Figure 5:
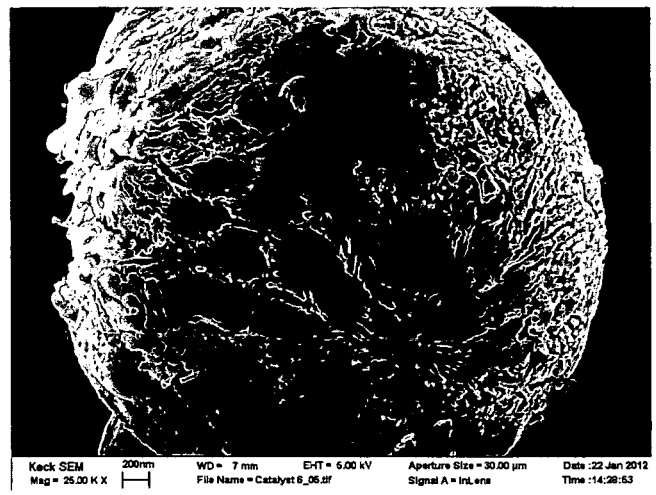
FIG. 5 is a SEM 25 k×view of an embodiment of the present invention.
Figure 6:
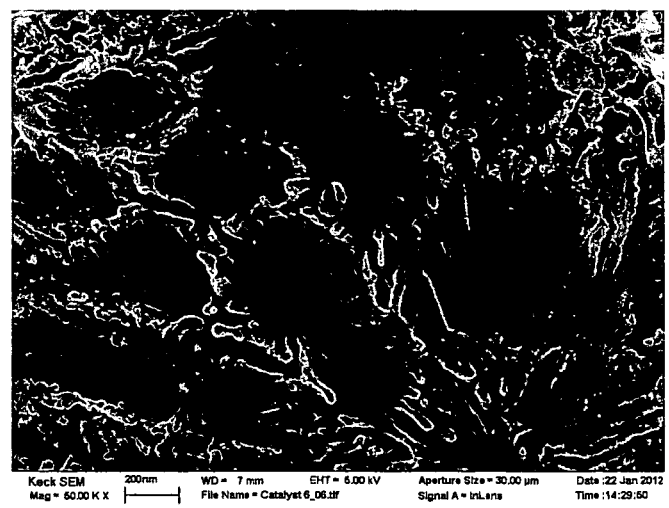
FIG. 6 is a SEM 50 k×view of an embodiment of the present invention.

This specification describes technologies relating to composite silicon or composite tin particles for use in an electrochemical cell and a method for making the same. The composite silicon or composite tin particles of the disclosed technology form a composition that has (i) a textured protection surface for easy SEI (solid electrolyte interface) formation, (ii) atomic solubility to improve the intrinsic conductivity of the particles so that a battery formed from these particles is useful for high rate application and (iii) a selectively textured surface for electrolyte reactivity.

In order for an anode material to reversibly react with lithium (meaning to charge and discharge an electrochemical cell without losing energy) and to provide a long battery life, the anode material should be able to form a stable solid electrolyte interface (SEI) from it's first charge/discharge process itself. This SEI should have a suitable thickness and have a textured or modified surface that helps stabilize the anode material in the cell. In the disclosed technology, the composite silicon or composite tin particles possess an ion permeable surface that helps in creating surface texture and stabilizing an SEI layer. The composite silicon or composite tin particles also have a non-silicon atom dissolved in silicon crystal structure which improves the intrinsic conductivity of the particles.

In the disclosed technology, the composite silicon or composite tin particles are formed to minimize pores on the surface of the particles and create spaces between individual crystals of the particles to accommodate the volume change (around 300%) that occurs in electrochemical cell. In other words, the disclosed technology includes methods of synthesis of composite silicon or composite tin based material/alloy in a particulate form having an open structure and dendrite column morphology while substantially lacking in pores. These features increase the storing/alloying capacity in an anode material in an electrochemical cell thus providing a higher energy density, specific capacity and cycle life than graphite or other carbon containing composites commonly used.

Silicon or tin are widely recognized as candidate materials for rechargeable batteries. Two classes of barriers, however, have impeded the use of silicon or tin in rechargeable batteries: (1) the self-destructive behavior of silicon or tin during battery charge discharge cycling due to volume expansion and contraction resulting formation of new SEI layer every next cycle with alloying behavior of Si or Sn and (2) the high cost of making silicon or tin of suitable particle properties.

The self-destruction of silicon or tin during cell cycling (charging/discharging) occurs because the very high capacity due to the alloying behavior of silicon or tin which translates to the very large amount of lithium being temporarily stored/alloyed with the silicon or tin. This causes a huge volume expansion and contraction of the anode, for example, up to 300 times volume change. During this expansion and contraction one of the consequences is that the SEI layer is damaged and the cycling stability of the cell deteriorates and some of the Lithium in a lithium ion cell is lost every cycle which translates to decrease in capacity in every cycle.

Much research has been conducted, and processes patented to produce silicon or tin based materials to achieve stable cycling and protect the SEI layer from damage during cycling. These inventions have proven to be effective in assuring cycling stability under certain condition of testing. However, these inventions lack other critical features for making commercially viable cells. These are related to one or more of the following: cell density, capacity and manufacturing cost for a full cell vs. the cathode material.

The disclosed technology found that combining good particle morphology, such as that obtained from eutectic silicon or tin dendrites, with compositional features provide for excellent cycling stability. A suitable composite silicon or composite tin particle structure can be obtained from a suitable alloy that has a eutectic microstructure, sometimes described as "feathery" or more commonly as dendritic. In some implementations, the structure of the composite silicon or composite tin can be an extended structure wherein each segment is crystallographically aligned where it joins with another segment. These structures allow the extended silicon or tin phase network to have columns or platelets arranged in an array such that the columns or platelets are joined with crystallographic alignment but extend into space in a manner providing for separation between the crystallite extensions. This silicon or tin phase was found to be of a shape and size that is ideal for use in anode materials but suffers from cycling stability unless it was formed in a manner providing for a composite material wherein the surface composition of the composite provides robust maintenance of the SEI layer.

In one implementation, a composite silicon or composite tin was obtained by selecting an alloy with a silicon or tin phase in an aluminum silicon or tin alloy by virtue of controlled solidification from the alloy melt. Aluminum silicon or tin, however, is not the only alloy system for which the silicon or tin phase can be substantially pure and possessing desirable morphology or other properties. Additionally, any alloy containing tin in which the tin content of the melt is the atomically minor constituent (relative to the combination of all other elements) and in which, upon cooling, the tin phase solidifies to greater than 75 wt % tin is a suitable material for use as an anode material.

There are also other potential alloys known in this series of material, including but not limited to: AlSi, LiSi, SiMg, SiFe (Iron-Silicon or tin Relay Steel), NiSi (Nisil), KSi, TiSi, SiMn, CuSi (Silicon or tin Bronze), BeCuSi, CeCuSi, AlMgSi, FeSiZn, CuSiZn, CuMnSi, CrNiSi, SiZnAl, AlSiNa, CrSiMg (Nicrosil), NiSiTi, CoCuSi, MoSiTi, NiMnAlSi (Alumel), MnSiC (Spiegeleisen), NiCrMoSi, NiCoCrSi, AlSiFeZn, SiAlMgCu, CMnCrSi (Silver Steel), CMnCrSiV and SiCuMgFeMnTiZr. Among these, any combination of elements where at least one of the major constituent possessing electrode potential less than H+, such as Mn, Mg, Al, Mo, Bronze (e.g., bronze may be used for alloy system containing elements such as tin, copper, aluminum, nickel, zinc, lead, bismuth, iron, manganese, germanium, tungsten, phosphorous, sulfide, etc), Be, Ti, Cu, Ce, Li, Fe, Ni, Zn, Co, Zr, K, and Na, etc. can be used.

Acids can then be used to form the composite silicon or composite tin in situ while extracting the eutectic structured network from the matrix. The choice of acids and a controlled pH environment is an important aspect of the disclosed technology because certain properties of the silicon or tin need to be preserved, e.g., the crystalline structure and obtaining a non-silicon or non-tin surface on the product particles, as shown in FIGS. 10a-b and 11. In use, light acids or organic acids, e.g., hydrochloric acid, can be used in a pH controlled environment between zero to one for at least 20 hours. Light acids are a class of acids that are not highly corrosive and are not considered a "contact poison", for example HF (hydrofluoric acid). The light acid class does not include any acid that (1) has a low dissociation constant and (2) are lipid soluble molecules that penetrate tissue more rapidly than typical mineral acids. Light acids also do not include any acid that dissolves the metal oxides. It is worthy to note that hard/soft considerations have nothing to do with acid or base strength. An acid or a base may be hard or soft and also be either weak or strong. In a competition reaction between two acids for the same base, one must consider both the relative strength of the acids, and the hard/soft nature of each acids and the base. So choosing a particular light acid is based on the alloy or elemental system being leeched.

Figure 9:
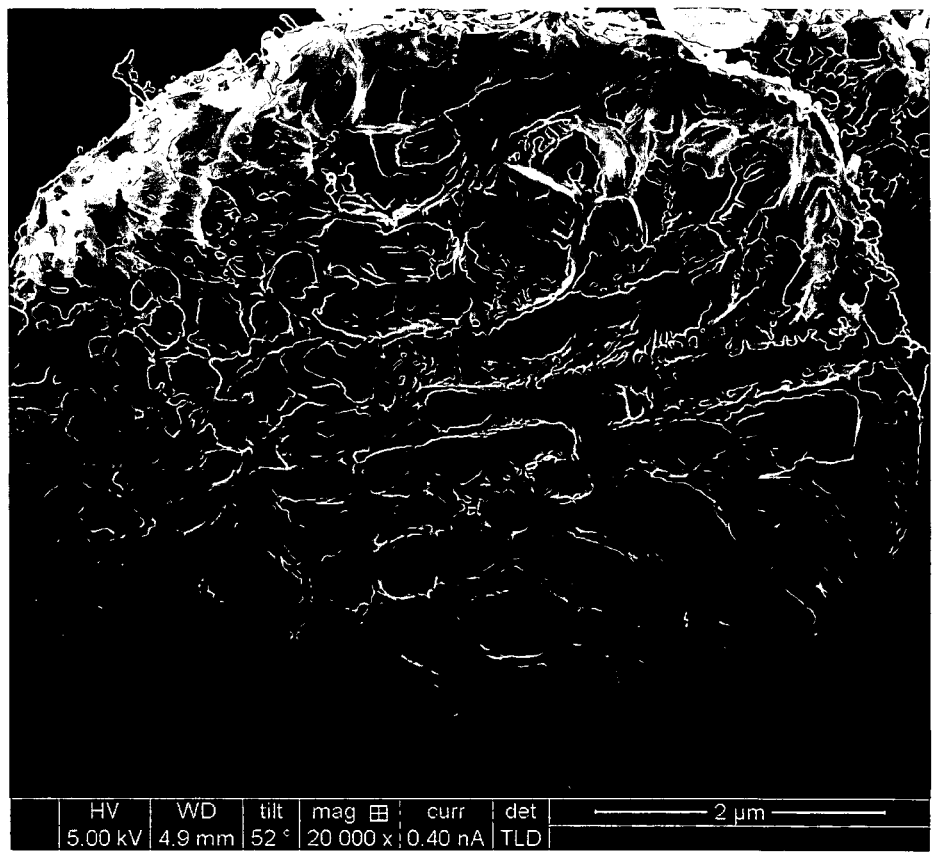
FIG. 9 provides images of a spherical composite particle revealing a 3D open structure.

This treatment with light acids dissolves the dominant non-silicon or non-tin phase. The selection of acid, however, is not to just etch the matrix but selectively texture the surface of composite silicon or composite tin and to avoid creating pores or holes in the particles, as shown in FIGS. 1-6. The composite silicon or composite tin thus formed possesses a very open structure within micron size assemblies as measured across a peripheral hydrodynamic boundary, as shown in FIG. 9. The open structure should not be confused with terms such as pores, porous, or voids. As pores, porous, or voids are defined as epidermal holes in a solid structure, the term open structure refers to the space between the crystallites.

Additionally, the size of the composite silicon or composite tin particles is less than or equal to 40 microns. This size of is dependent on the alloy used as these alloys can come in different particle size. In the disclosed technology, an alloy powder can be used which is less than 40 micron in size. The importance for choosing such a size is that an anode laminate thickness is usually less than 100 micron, and if larger particles (>40 micron) are used, it increases the chances that particles may break into individual crystallites when they are passed through the calendaring process, i.e., a process involved in Li ion cell making.

Figure 7:
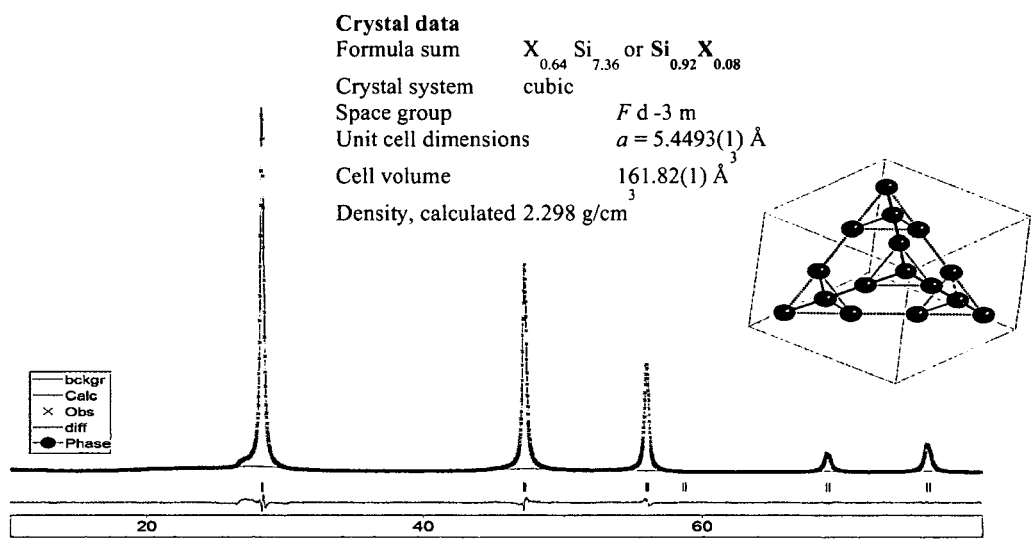
FIG. 7 provides crystal data of an embodiment of the present invention.

This open structure and the selectively textured surface of composite silicon or composite tin accommodates volume expansion that normally self-destructs silicon or tin particles when used in an electrochemical device as an anode. in other words, the composite silicon or composite tin particles includes structures that are not mechanically rigid but instead are able to readily move to accommodate dimensional changes during cell cycling while also providing a surface composition providing for stable cycling. High resolution X-ray diffraction and atomic arrangement of doped silicon crystal is shown in FIG. 7.

Also, it is this open composite structure that helps with particle contact with current collectors, binders conductive agents as well as the electrolyte during charge as well as discharge. If needed, the open structure can also be used to add other active or inactive materials to control expansion as will be described below.

In one embodiment, the composite material is formed using an acid/base or combination by creating a salt of the major constituent M where M is silicon or tin. The alloy feed material contains about 10-15% silicon or tin but after removing the matrix material with acids we are left with a composite containing a majority of silicon or tin, the range for acceptable product is between 80% and 97%. The resultant composite particle has no remaining pure aluminum matrix.

The composite silicon or composite in could include a portion of the base metal of the alloy (M'), e.g., Al, within the crystal lattice of the silicon or tin and accounts for about 7-8% of the silicon or tin composite weight which improves its intrinsic properties. Also, the part of aluminum that is dissolved in the silicon or tin (or tin) crystal structure remains within the composite silicon or composite tin structure without leading to any pore formation.

Figure 8:
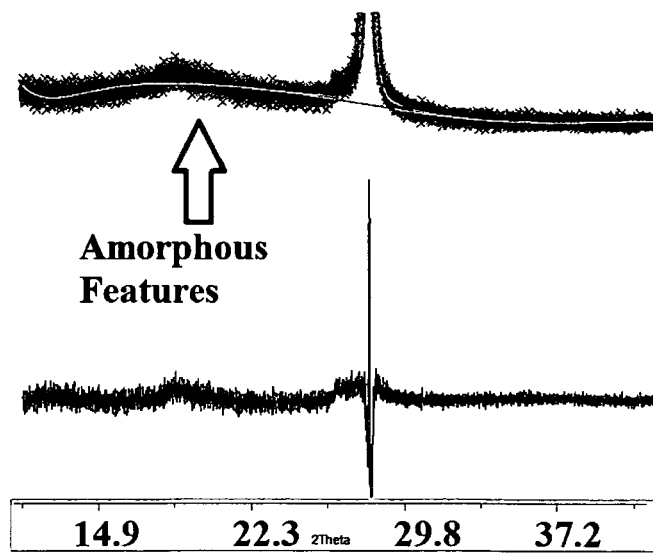
FIG. 8 provides a high resolution X-ray diffraction indicating amorphous phase in powder produced by the present invention.

The composite silicon or composite tin should include an amorphous or crystalline component, e.g., MZ and/or M'Z (where Z may be e.g., O, N, Cl, P, C, S, H, and F, as shown in FIGS. 10a-b and 11. The Z component is mostly counter ions in acids or bases commonly used. The texture on the surface depends upon which acid is used. For examples, common acids are HCl, H2SO4, CH3COOH, H3PO4, HNO3, etc. Based on the leaching agent used, the composite formulation would change. The presence of MZ or M'Z or both can be detected by a combination of characterization techniques, e.g., synchrotron XRD, EELS, ICP, high resolution TEM and ED. In some implementations, the amorphous or crystalline component can be either SiOx or AlOx or both and is located either within the crystal or surface of the particle. That is, using mild acids develops an oxide coating on the surface of the silicon or tin of non-uniform thickness that can be progressively thicker towards the center of the cluster. Using high resolution X-ray diffraction, synchrotron, the presence of amorphous phase in the particle is below 50 wt % as shown in FIG. 8. In some implementations, the coating can have a compositional gradient along the outer-most silicon or tin feature to the center of each cluster. The presence of the oxide surface layer on the particle structure aids in the specific capacity, cycling properties in a rechargeable battery cell.

In a preferred implementations, the composite silicon or composite tin has a formula of MM'Z and can include 90 wt % silicon or tin, 7 wt % aluminum that remains within the crystal structure and 3 wt % of a surface material, mostly an oxide, the oxide surface material may contain other elements. The resultant composite silicon or composite tin can be described as a metal/ceramic matrix, a metal oxide matrix or a composite (silicon or tin and metal oxide) material. The composite silicon or composite tin may be in the form of a powder.

In some implementations, the composite silicon or composite tin can contain at least 75 wt % silicon or tin in which the surface area is greater than 50 m2/g and in which at least 30% of the particles has the same crystallographic orientation and is used to alloy with lithium.

In some implementations, the composite silicon or composite tin can be a particle in which the silicon or tin content is greater than 75 wt % and the ratio of BET surface area (m2/g) to particles diameter (microns) is greater than 4 and in which the void contribution to total BET surface area is less than 10% of the total surface area and is used to alloy with lithium.

In some implementations, the composite particle can have dimensions far in excess of 100 nm, such that the overall crystal is greater than one micron. In some implementations, the population of pores in the silicon or tin can contributes less than 10% of the total BET surface area. In some implementations, the particle can have a BET surface area of greater than 50 m2/g. In some implementations, all particles can have a BET surface area greater than 50 m2/g and a diameter greater than 1,000 nm. Particles thus formed crystallize in F d −3 m space group.

In some implementations, at least 30% of the silicon or tin crystals within a composite particles are physically grown along [111] crystallographic planes, at least 5% of the silicon or tin crystals are grown along other plane [200] or [311] or [400], [311] or [422] or [511] or [440] or [531] or [620] or [533] or [711] or [551] or [642], [553] or [731], at least 30 m2/g surface area is the contribution from the crystals grown along [111] and greater than 10% of the total surface area is contributed from the crystallographic planes such as [111] or [100] or [010] or [001] or [110].

In some implementations, the particle can have a higher crystal level doping or substitution (up to 20 wt %), making it either p-type (doping of a trivalent atom, typically from group 13 of the periodic table, such as boron or aluminum etc.) or n-type semiconductor (doping of pentavalent elements such as antimony, arsenic or phosphorous etc.). That is, a small amount of doping (or substitution) in crystal not only improves the mechanical strength of the crystal, that to tolerate the volume expansion and contraction while the Li alloys or de-alloys in an electrochemical cell. Such doping also dictates the crystallographic orientation of primary crystallites or crystallite grains nucleate along [111] or [100] or [010] or [001], which eventually governs the morphology, shape and fractals dimensions and contributes towards the inherent conductivity of the material. This also improves fracture resistance of the silicon or tin composite and therefore improves cycling efficiency, up to 30% lithium alloying gives up to 98% cycling efficiency above 100 cycles.

In some implementations, a means of clustering silicon or tin panicles in the form of rods within the composite particle in a manner such that there is a binder material holding all of the primary particles into a robust structure are included. The binder material can be organic molecules (e.g., polymers, surfactants, long chain amines, biomolecules, sea algae, latex, conducting polymers or nano-carbon), metals, ceramics, composite materials or combinations thereof. In other words, composite particles containing primary composite particles of high aspect ratio can be held together by a second material and in the general form of a macro-particle. The various spacing between the composite particles can be sufficient to allow for volumetric expansion of the composite during lithiation without self-destruction to the point of being non-functional. The binder material can be sufficient to mechanically hold the various composite particles together to a sufficient degree that the volumetric expansion of the composite during lithiation is enabled with a limit on self-destruction such that the clustering composite rods are functional for use as an anode material. The binder phases are critical to the robustness of the clustered composite rods. This binder can be inserted into the particles by 0.5 wt % at least. Such impregnated particles may then be heated at higher temperature (above 200° C.) which gives above 0.2 wt % carbonous coating on the Si surfaces. Coating thus formed has at least 1 wt % sp2 carbon of the total carbon present in and around the particle.

In some implementations, heating liberated composite particle at an elevated temperatures for more than 1 minute (100° or higher) under different atmospheres (air or oxygen or nitrogen or He/H2 or argon or combinations) increases electrochemical performance of material by greater than 5%. That is, controlled heating of liberated composite for more than 1 minute (100° C. or 200° C. or 300° C. or 400° C. or higher) under different atmospheres (air or oxygen or nitrogen or He/H2 or argon or combinations) followed by other dissolution treatments can increase the specific capacity of the composite by 20%. In a preferred implementation, the composite was heated at 400 degrees in air. In another implementation, the composite was heated at 400 degrees in a 100% Nitrogen rich environment.

In some implementations, the density of the material can be adjusted based on melt alloy choice or elective etching for instance the density can be varied between 0.6-3 g/cc. The final product BET or surface area of the particles can be varied between 30 to 200 m2/g.

In one implementation, a process to synthesize a composite structure where the structure is formed by using at least a two metal combinations/alloys/intermetallics having silicon or tin as one phase in which the silicon or tin is in atomic minority prior to creating a metal/metal oxide/carbon composite using an acid or an acid/base mixture where the other element which is in majority is in a salt from after extraction, where the composite particle obtained can be used in an electrochemical cell (lithium, sodium, lithium sulfur, lithium air, 1). The starting alloy has at most 30% silicon or tin but after treatment with an acid has greater than 80% silicon or tin and remaining salt. The composite thus produced contains at least 30% of particles in the 111 direction and has a surface area where at least 33% of the surface area comes from open structure. The composite also has at least 30% of the particles having a leaf/vein/finger structure where the length is at least 3 times the diameter. A composite structure where at least 20% of the weight has an amorphous phase but greater than 1% Most of the Transition metals can be alloyed with Tin, Mn, Fe, Co, Cu, Zn, Cr, V, Mo, etc., one industrially known composition is Al—V—Sn—Fe—Cu, where Sn concentration also varies from 11-14%), however the acid has to be different than HCl (as it can etch Sn as well). Organic acids or other ways of subtraction is an alternate.

In another implementation, the composite particle is an extended structure wherein each segment is crystallographically aligned at the joint with another segment and of dimensions far in excess of nano-dimensions, such that the overall crystal is measured in microns to 10 s of microns. There is no significant population of pores in the particle and each composite particle has an extremely high surface area relative to its mass.

In another implementation, a particle can be an extended structure wherein each segment is crystallographically aligned at the joint with another segment of dimensions far in excess of 100 nm, such that the overall composite is greater than one micron, the population of pores in composite particle contributes less than 10% of the total BET surface area, each particle has a BET surface area of greater than 50 m2/g. An embodiment of the present invention is all silicon or tin composite particles having a BET surface area greater than 50 m2/gm and a diameter greater than 1,000 nm.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

In an example, Si composite was synthesized by mixing 120 gm of SiAlCu alloy intermittently (15 gm in every 10 minute) in 2.5 Liters of 6M HCl. During this the solution was stirred with a constant speed of 200 rpm using Teflon coated stainless-steel stirrer. After complete addition of solid, acidic concentration of the solution was maintained at −0.4 pH for next 24 hours with 600 rpm stirring speed to keep the powder dispersed and smooth evacuation of hydrogen bubbles and gas. After completion of the reaction (no evolution of hydrogen bubbles or other gas), solution was filtered off and the remaining solid was washed and dried in vacuum. Such silicon or tin composite powder was found to have a specific capacity in excess of 1200 mAh/gm and demonstrated capacity retention of >90% after cycling >100 cycles. SEM photographs of the silicon or tin composite particles at various levels of magnification are shown in FIGS. 1-6.

Example 2

In an effort to insert organic molecules within silicon or tin composite particles, 0.3 gm of agar-agar (0.25 wt % of starting alloy) was put into the solution intermittently after every 6 hours to make a total 1.2 gm (1% by weight of starting alloy) in 24 hours. Such solution was sonicated and/or stirred vigorously for 2 hours before filtrating.

Example 3

The obtained Si composite of Example 2 was blended with SuperP carbon and ammonium alginate binder in a weight ratio of 75:15:10. De-ionized water was used to make a slurry in Teflon vial with zirconia media (1:3 weight ratio) and milled for 2 hours, which later casted on a carbon coated copper foil; the casting was cut into 1.4 cm2 circular electrodes and dried overnight at 100° C. in air. Active loading of around 3~5 mg/cm2 was achieved. Lithium foil was used as the counter electrode for the electrochemical testing. The electrolyte was 1 M LiPF6 dissolved in a 1:1 mixture of EC/DMC with 4 wt % FEC. The coin cell was cycled between various cut of voltages including, 0.01 V-1.5 V, 0.07V-1.5 V, 0.1-1.5 V and 0.15 V-1.5 V. All results show the capacity of minimum 800 mAh/gm with 90% cycling efficiency after 50 cycles.

As described in Example 3, the above composite particles can be used to make a paste for a negative electrode. The paste can include the silicon or in composite, a binder and a solvent. The paste can be formed by kneading the silicon or tin composite, the binder and the solvent into a shape of sheet, pellet or the like.

The binder can be polyethylene, polypropylene, ethylenepropylene terpolymer, butadiene rubber, styrene butadiene rubber, butyl rubber, and polymer compounds having a high ion conductivity. A preferred blending ratio of the binder against the silicon or tin composite graphite is such that the binder is used in a range of 0.5 to 20 parts by mass based on 100 parts my mass of the silicon or tin composite.

There is no particular limitation on the solvent. Examples of the solvent include N-methyl-2-pyrroridone, dimethylformamide, isopropanol and water. In a case where water is used as a solvent in the binder, it is preferable to use a thickening agent together. The amount of the solvent is adjusted to have a suitable viscosity which makes a step of coating a collector with the paste easy.

The negative electrode can be formed by coating a collector with the paste, drying the combination and then pressure-molding the combination. Examples of collector include foils and meshes of nickel or copper. There is no limitation on the method for coating the collector with the paste. The coating film thickness is generally in a range of 50 to 200 nm.

Examples of pressure-molding method include methods using roll-pressure or press-pressure. A preferred pressure at the time of pressure-molding is from about 100 to 300 MPa (about 1 to 3 t/cm2). A negative electrode obtained in this way is suitable for a lithium battery.

The positive electrode contains a cathode active material as a constituent. Examples of cathode active material include LiMPO4 (M=Fe, Ni, Mn, Co or combination thereof), LiNiO2, LiMO2 (Mn, Co, Ni or a combination there of) and LiM2O4 (M=Mn, Ni, Cr, Ga, or a combination there of). There is no limitation on the electrolytic solution used in the lithium battery. Examples thereof include so-called organic electrolytic solutions obtained by dissolving lithium salt such as LiClO4, LiPF6, LiAsF6, LiBF4, LiSO3CF3, CH3 SO3 Li and CF3 SO3 Li in an non-aqueous solvent such as ethylene carbonate, diethyl carbonate, dimethyl carbonate, methylethyl carbonate, propylene carbonate, butylene carbonate, acetonitrile, propylonitrile, dimethoxyethanen, tetrahydrofuran, and γ-butyrolactone, and solid or gelatinous so-called polymer electrolyte.

A separator may be provided between the positive electrode and the negative electrode. Examples of separator include nonwoven fabric, cloth and microporous film mainly consisting of polyolefin such as polyethylene and polypropylene and combination of these materials.

The battery using the silicon or tin composite can be assembled by conventional method and be used in various applications. Examples of uses include lap-top personal computer, cell phone, wireless applications, electronic notebook, electronic meter, electronic key for automobile, power storage facility, electric power tool, radio control toy, digital camera, digital video, portable audio-visual equipment, cleaner, electric bicycle, electric motorcycle, electric-assist bicycle, automobile, airplane and ships. The battery can be used in any of these.

While this specification contains many specific implementation details, these should not be construed as limitations on the scope of the disclosed technology or of what can be claimed, but rather as descriptions of features specific to particular implementations of the disclosed technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

The foregoing Detailed Description is to be understood as being in every respect illustrative, but not restrictive, and the scope of the disclosed technology disclosed herein is not to be determined from the Detailed Description, but rather from the claims as interpreted according to the full breadth permitted by the patent laws. It is to be understood that the implementations shown and described herein are only illustrative of the principles of the disclosed technology and that various modifications can be implemented without departing from the scope and spirit of the disclosed technology.

The invention claimed is:

1. A particle of a composite composition for use in an electrochemical cell comprising:
   a general formula of MM'Z.C, wherein M is from the group of Si and Sn, M' is from a group of Mn, Mg, Al, Mo, Bronze, Be, Ti, Cu, Ce, Li, Fe, Ni, Zn, Co, Zr, K, and Na, Z is from the group of O, Cl, P, C, S, H, and F and C is Carbon; and a surface composition being an oxide, the surface composition being textured, and wherein a major dimension of the particle is less than 100 microns, and wherein at least 2% by weight of M' is doped into a crystal structure of M, and wherein M is arranged in an array of columns joined by crystallographic alignments with separation between the columns.

2. The particle of claim 1 wherein MM'Z.C is mixture of MM'Z, and C.

3. The particle of claim 1 wherein C is coated on surfaces of an MM'Z particle.

4. The particle of claim 1 wherein 0.2 wt % of C is coated on of an MM'Z particle surface.

5. The particle of claim 1 wherein a coating of C is formed on surfaces of a MM'Z particle and the coating has at least 1 wt % in and around an MM'Z particle.

6. The particle of claim 1, where C is inserted into a MM'Z particle.

7. The particle of claim 1, where C is inserted into a MM'Z particle by at least 0.5 t %.

8. The particle of claim 1 wherein C is at least one of sp2 carbon, conductive carbon, graphitic carbon, carbon black, nano carbon, graphene, graphite, acetylene black and mixtures thereof.

\* \* \* \* \*